Figure 1:
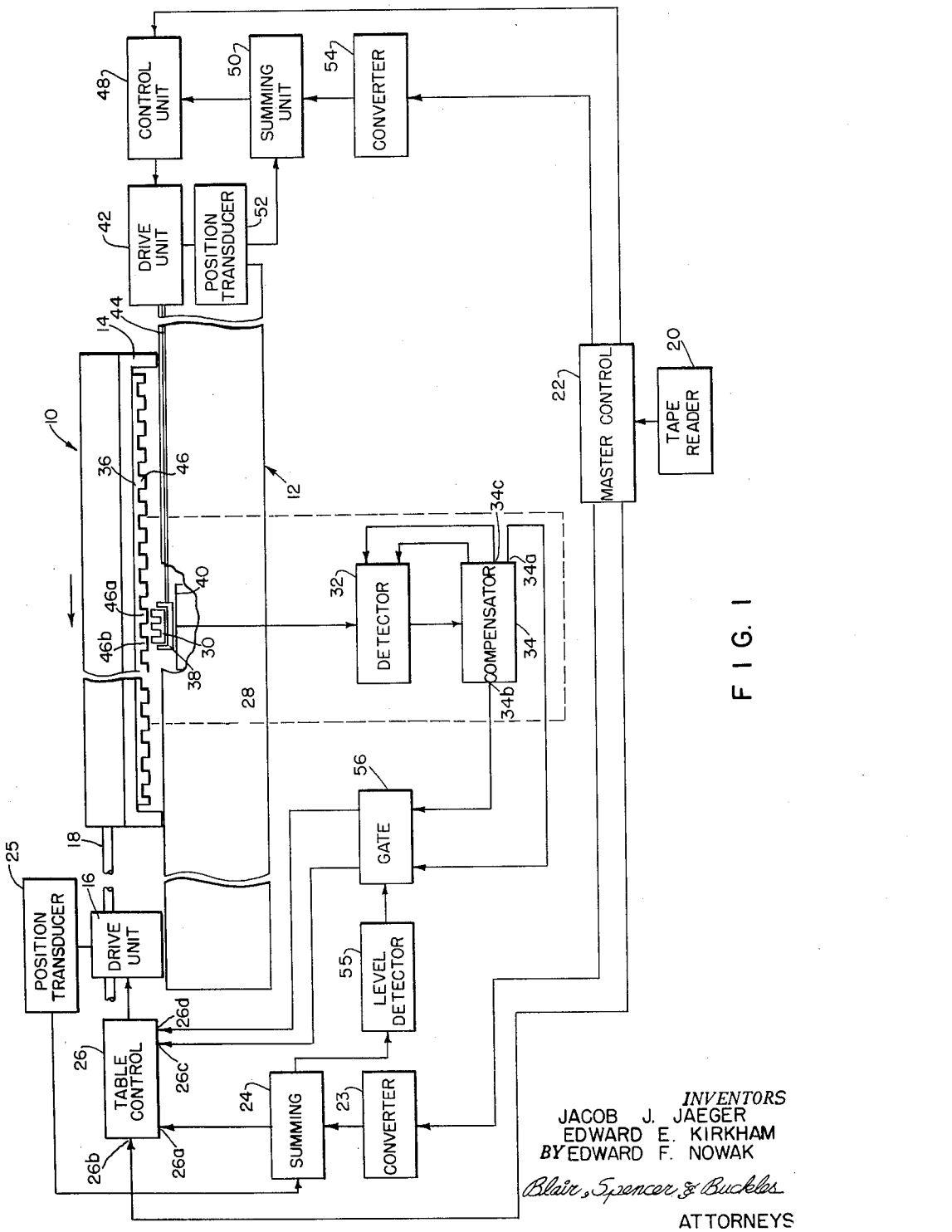

Dec. 11, 1962   J. J. JAEGER ET AL   3,068,386
NUMERICAL CONTROL POSITIONING SERVOSYSTEM
Filed April 8, 1960   5 Sheets-Sheet 1

INVENTORS
JACOB J. JAEGER
EDWARD E. KIRKHAM
BY EDWARD F. NOWAK
Blair, Spencer & Buckles
ATTORNEYS (TRUE NULL)

FALSE NULL

INVENTORS
JACOB J. JAEGER
EDWARD E. KIRKHAM
BY EDWARD F. NOWAK

ATTORNEYS

INVENTORS
JACOB J. JAEGER
EDWARD E. KIRKHAM
BY EDWARD F. NOWAK

Blair, Spencer & Buckles
ATTORNEYS

United States Patent Office 3,068,386
Patented Dec. 11, 1962

3,068,386
NUMERICAL CONTROL POSITIONING SERVOSYSTEM
Jacob J. Jaeger, North Canton, Edward E. Kirkham, Manchester, and Edward F. Nowak, Hartford, Conn., assignors to Pratt & Whitney Company, Inc., West Hartford, Conn.
Filed Apr. 8, 1960, Ser. No. 26,395
20 Claims. (Cl. 318—28)

This invention relates to a digitally controlled positioning system for machine tools and the like. More particularly, it relates to an improved position sensing unit adapted to provide accurate information relating to the position of a worktable, carriage, or other movable element of a machine, as well as an output signal useful in controlling the movement of the element into a preselected position. The sensing unit incorporates a magnetic head in a novel bridge circuit capable of emitting null balance signals which control the final approach speed of the moving element and stop it at its desired position. Through the use of unique logic circuitry, we have also eliminated errors resulting from false bridge null indications.

Positioning systems of the general type with which our invention is concerned make use of control information recorded in digital form on punched tape, magnetic tape or other suitable media. An entire sequence of machine operations may be recorded in this manner for automatic control of the machine. As an example of the manner in which the various machine movements are controlled, one may consider the traverse of a worktable on a jig borer. The workpiece to be bored is clamped to the table and the table is moved so that holes may be bored at various specified locations on the workpiece, as dictated by the recorded digital information. The worktable is mounted on a slide guided for traverse on a movable carriage. The carriage is similarly mounted for movement in a direction perpendicular to the traverse of the worktable, and thus by coordinating movement of the carriage and worktable, any point of the workpiece may be brought into position for boring.

In order to control the location of the worktable on the carriage, a position sensing system is provided to determine the position of the table with respect to a reference point on the carriage. This position is compared with the desired position obtained from the recording medium, and a table drive unit is energized to move the table in the proper direction to make the actual position coincide with the desired position.

In one positioning system, a coarse control is used to bring the worktable within a prescribed distance from its final position, and a fine control then takes over to regulate movement over the final increment of travel. Since the fine control always operates over a short distance, it may be made to perform with a high degree of accuracy; and the coarse control is then relieved of rigorous accuracy requirements which are difficult to obtain over a long range of travel.

A typical coarse control uses a converter to convert the digital position instructions to an analog signal in the form of a voltage. The voltage is compared with a voltage from a position transducer reflecting the actual position of the turntable. The difference between these voltages is an error signal indicative of the distance between the actual and desired positions, and the table is driven in the proper direction to reduce the error signal to zero.

The fine control described herein uses a magnetic sensing head to sense the position of the worktable during its final increment of travel. A measuring bar aligned with the direction of table traverse is mounted on the worktable. The bar is provided with a series of accurately machined lands and indentations periodically spaced along its length. The sensing head, which is mounted on the carriage, has a pair of inductors whose flux paths extend into the measuring bar on the table. When one of the lands on the measuring bar is positioned an equal distance from each of the inductors, their inductances are equal, and a bridge circuit incorporating the inductors registers a null, herein termed a "true null," to indicate this condition. The coarse positioning system moves the table to bring a given land within the magnetic field of the sensing head, and the output of the sensing head is then used to control the final increment of table travel to bring it to rest in a true null position.

Economical use of machine tools dictates high speed for the various operations including traverse of the worktables, carriages, etc. However, if the high speed is continued into the final increment of travel, during which an accurate sensing unit measures the position of the moving element, inertia will cause the element to coast through the desired final position after the motive power has been cut off. Therefore, it is desirable to derive a signal at a predetermined point shortly prior to arrival at the final position and use this signal to reduce the drive speed to a low level. Then when the position sensing unit indicates the close proximity of the moving element to its final position by means of a bridge null, as described above, or other suitable means, the driving power may be cut off and the element will coast approximately to the center of the dead band in which the error signal indicating departure from the exact null is insufficient to reposition the element.

One method of obtaining the speed reduction signal is to use a sensing head of the above type and connect additional impedance elements into the bridge circuit incorporating the sensing head inductors. These elements change the balance condition of the bridge so that it balances at a position reached by the moving element prior to the final true null position. The null obtained at this prior position may be termed an "offset true null." When the offset true null position is reached, the null signal from the bridge circuit is used to disconnect the additional impedance elements from the bridge circuit as well as reduce the speed of the moving element. Thus, the bridge once again becomes unbalanced to indicate positional error until the true null position is reached.

In order to obtain a complete null, i.e., substantial bridge balance, at the offset true null position, both the magnitudes and phase angles of the various impedances in the bridge must be properly matched when the additional elements used for the offset null are connected into the circuit. Prior to our invention this required the use of a substantial number of additional elements requiring careful adjustment. Furthermore, it is sometimes desirable to vary the position of the offset null over a substantial range, and this has been difficult to accomplish with prior circuits.

The use of magnetic sensing head of the above type has been accompanied by complications resulting from bridge nulls which occur at measuring bar locations other than the respective true null and offset true null positions. More specifically, a null, termed a "false null," may occur when a groove, rather than a land, is between the inductors of the sensing head. In other words, the false nulls occur midway between adjacent true null positions of the measuring bar, and when the bridge circuit connected to the sensing head is in its normal condition, there will be two nulls for each full unit of movement determined by the distance between the centers of adjacent measuring bar lands. When the additional circuit elements are connected to the bridge to place it in an offset condition, it will, of course, register neither the true nor false nulls. Rather, it will balance at both the offset null position and an offset false null position reached shortly after the measuring bar passes through the false null position, i.e., somewhat after the measuring bar has passed half the distance from one true null position to the next true null position.

This imposes a fairly stringent requirement on the coarse position control. The latter must, in each case, cut in the fine position control after the table has passed the offset false null position and before it has reached the offset null position immediately prior to the final true null position where the worktable is to stop. If the fine control is cut in before the offset false null position is reached, a null indication at that position will cause the table traversing mechanism to shift to low speed at that point and continue at low speed to the ultimate true null position. The low final speed is on the order of .001 in. per sec., and assuming a spacing of one inch between the centers of adjacent lands on the measuring bar, this would result in a considerable slowing of the traversing operation. The necessity of meeting the accuracy requirements imposed by the presence of false null positions results in a relatively expensive coarse position control, particularly as regards the position transducer used therein. Furthermore, frequent adjustment is required to maintain the required degree of accuracy.

The presence of false nulls also has prevented the counting of successive nulls as a means for determining the distance which the measuring bar has traversed, and in certain applications this is a desirable mode of operation. The amplitudes of the false nulls vary over a considerable range, and therefore their presence cannot be counted on for every unit of travel by the measuring bar. Nor can level discrimination be used without cutting out some of the true nulls.

Accordingly, it is a principal object of our invention to provide an improved system for automatically positioning moving elements of machine tools and the like with a high degree of accuracy.

It is another object of the invention to provide a system of the above character adapted to use input data in digital form.

A further object of our invention is to provide a positioning system of the above type using an analog coarse position control together with a fine control which controls the final increment of travel of the moving element into its desired position.

Another object of our invention is to provide a position sensing unit for use in a fine position control of the above character which emits a signal at a predetermined position of the moving element immediately prior to its final position to facilitate reduction in speed of the element. The fine control should be capable of being put into operation when the moving element is a substantial distance from its final position without affecting the point at which speed is reduced.

A further object of our invention is to provide a position sensing unit having the above capabilities which utilizes inductors whose positions relative to successive lands on a measuring bar are sensed by a nulling circuit and which eliminates the effect of false nulls.

Yet another object of our invention is to provide a simple, efficient circuit for providing output signals from the position sensing unit at various positions of the respective measuring bar lands.

A further object of the invention is to provide a position sensing unit of the above character capable of emitting unambiguous output signals which may be counted to determine the amount of movement of the moving element.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

Figure 2:
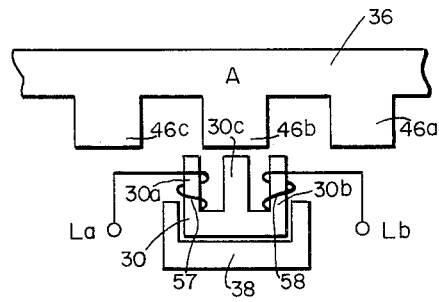
Figure 3:
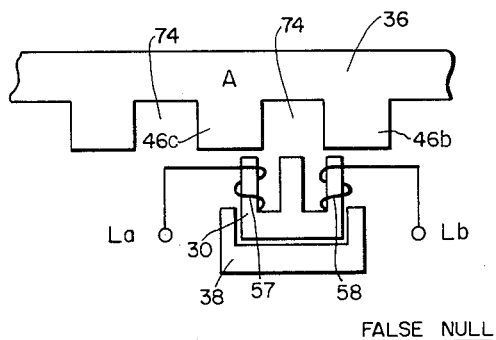
Figure 4:
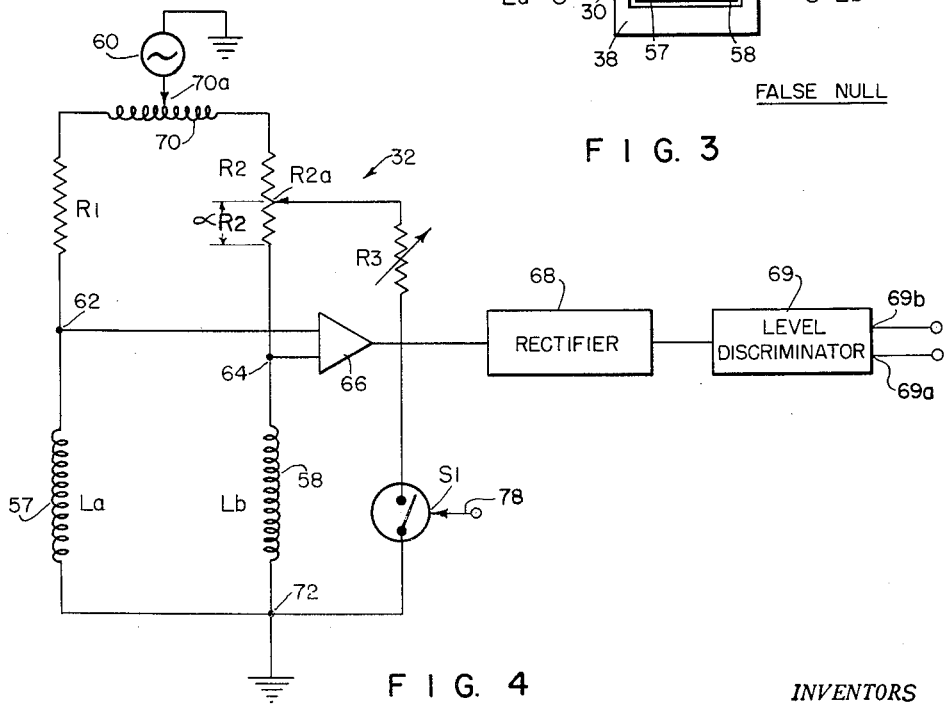
Figure 5:
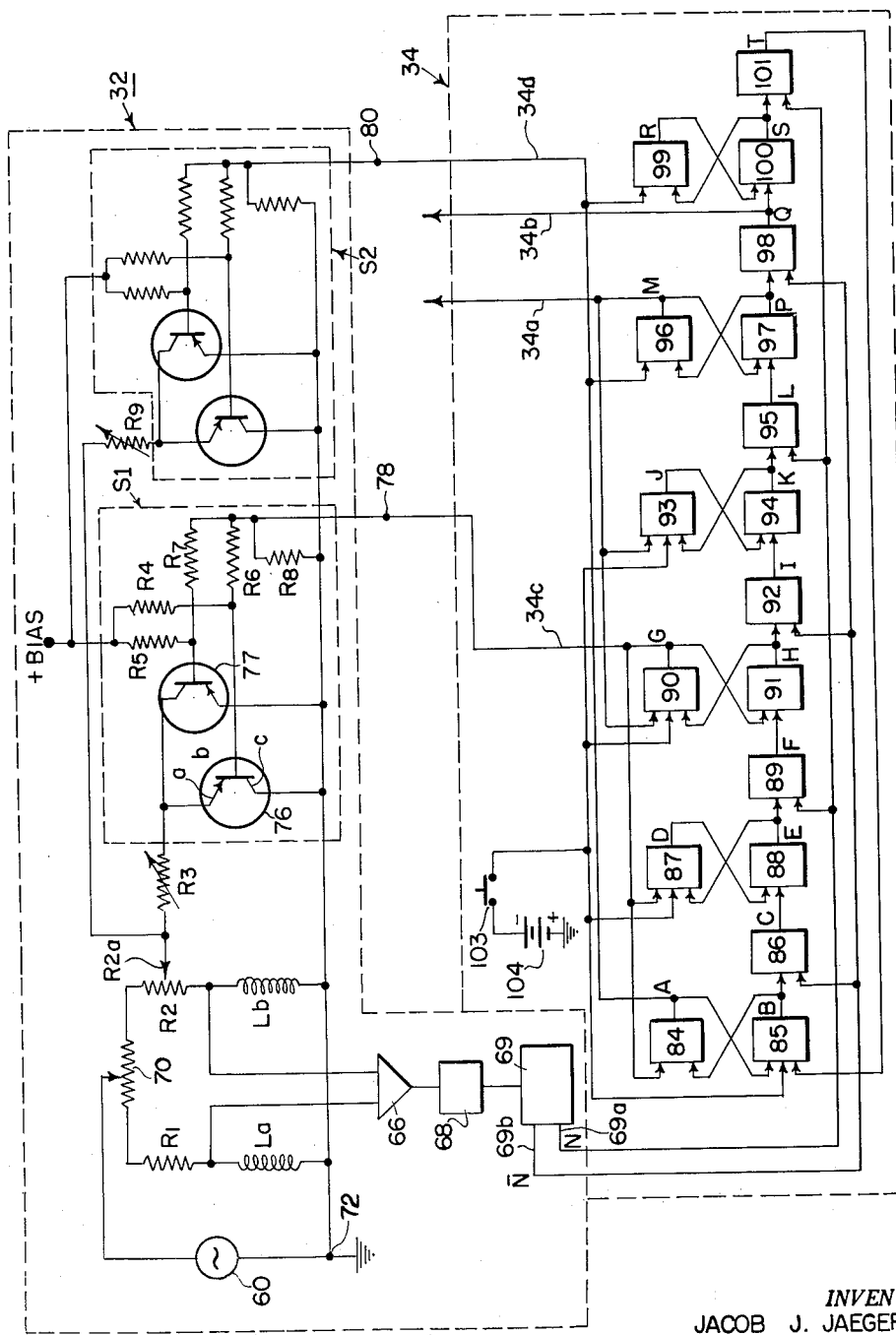
Figure 6:
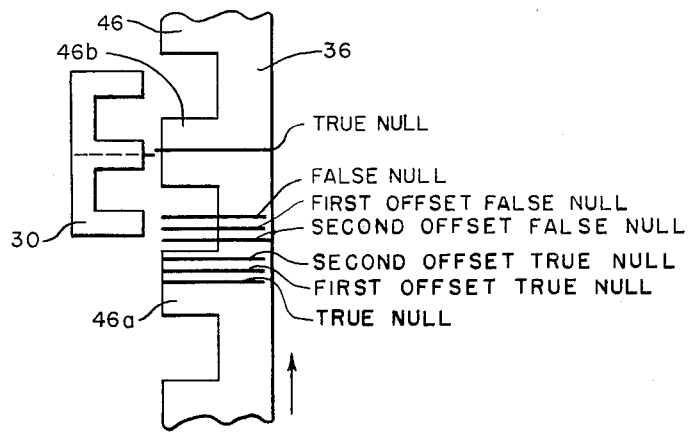
Figure 9:
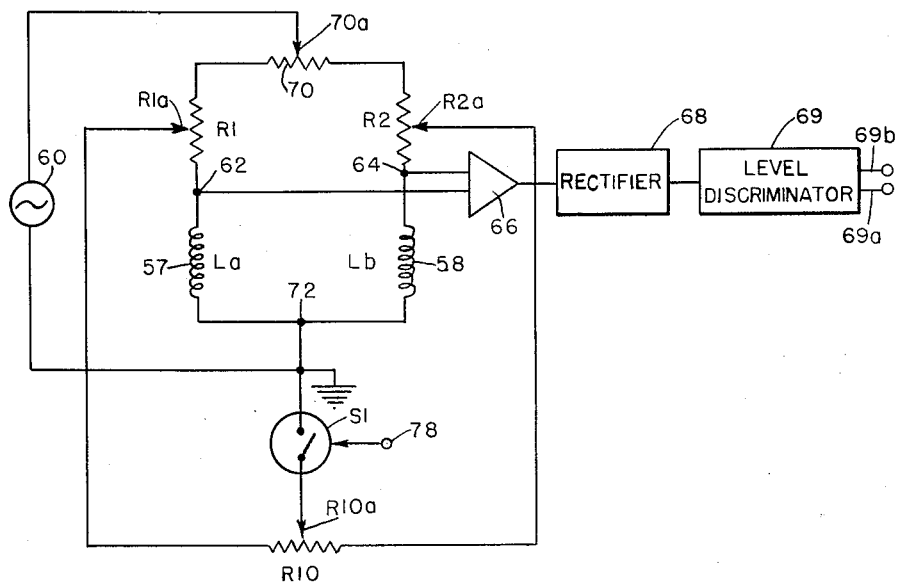
Figures 7, 8:
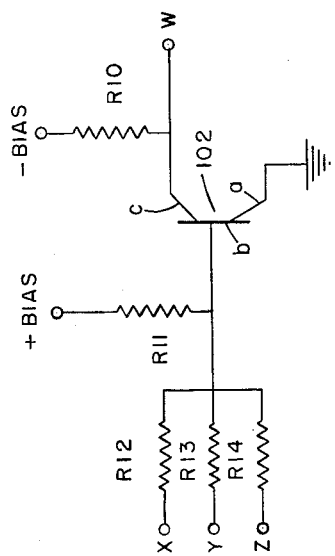

For a fuller understanding of the nature and objects of the invention, reference should be had to the following detailed descripiton taken in connection with the accompanying drawings, in which:

FIGURE 1 is a schematic diagram of a positioning system incorporating the features of our invention, FIGURE 2 shows the sensing head and measuring bar in a true null position, FIGURE 3 shows the sensing head and measuring bar in a false null position, FIGURE 4 is a simplified schematic diagram of a null indicating circuit including the inductors of the position sensing unit and provided with offset null circuitry incorporating the features of our invention, FIGURE 5 is a schematic diagram of a position sensing unit incorporating our offset null circuitry and providing false null compensation in accordance with our invention, FIGURE 6 illustrates the relative positions of the sensing head and measuring bar at significant points during movement of the worktable of FIGURE 1, FIGURE 7 is a schematic diagram of a "nor" element used in the false null compensator of FIGURE 5, FIGURE 8 is a table showing the state of the switching circuitry of FIGURE 5 for various null sequence combinations, and FIGURE 9 is a schematic diagram of a modified null indicating circuit embodying the principles of our invention.

In general, our positioning system incorporates a novel, logical arrangement making use of certain characteristics of the false null and offset false null positions in eliminating their effect on the output signals emitted by the fine position sensing unit. A first offset circuit is provided which, when connected to the null indicating bridge circuit, causes a first offset true null immediately prior to the true null position for use in reducing the speed of the moving element. A second offset circuit, when connected to the bridge circuit, causes a second offset true null indication to be emitted at a point prior to the first or speed-reducing offset signal position. There are offset false null positions corresponding to the two offset positions, as well as a false null position corresponding to the true null position. The order of the false positions is (1) false null, (2) offset false null corresponding to the speed-reducing offset null, and (3) offset false null corresponding to the second offset null.

Each time the moving element leaves a true null position, the sensing unit is switched to the second offset condition. The element thus passes through the false null position and the offset false null position corresponding to the speed-reducing offset without an indication from the sensing unit. The circuit is arranged so that the next null indication will connect the first offset circuit to the bridge circuit. This null will be either the offset false null corresponding to the second offset position or the second offset true null itself. If the false null is detected, the bridge circuit, now set to detect the speed-reducing null, will not sense the second offset true null, but will sense and indicate the next following null, which is the speed-reducing null. If the offset false null corresponding to the second offset true null is not detected, the second offset true null will be. Again, the sensing unit will be switched to its speed-reducing null condition so that it can indicate the passage of the latter null position.

When the speed-reducing null position is reached, the offset circuit corresponding thereto is switched out of the circuit, and the bridge circuit is in its normal condition. It is thereby adapted to detect the true null which follows, and a signal is emitted by the circuit when this latter condition obtains. Thus, whether or not an offset false null is detected, its effect is completely eliminated by the sensing unit in determining the presence of the speed-reducing offset null and the following true null.

Our invention also includes a novel offset null circuit especially adapted for incorporation in the above position sensing unit. It requires that only one additional element can be connected to the bridge circuit to place the circuit in an offset condition. The connection is a parallel connection and is therefore easily made. Furthermore, the circuit can be readily adjusted to facilitate changes in the offset null positions.

Turning now to FIGURE 1, a worktable generally indicated at 10 is suitably mounted for traverse on a carriage generally indicated at 12. The worktable and carriage may illustratively be used to position a workpiece to be bored by a jig borer. The worktable 10 is provided with a slide schematically indicated at 14, suitably interfitting with the top of the carriage 12. Traversing movement is imparted to the table 10 by a table drive unit 16 connected to the table by a shaft 18. The carriage 12 is conventionally provided with a slide (not shown) mounted for movement in a direction perpendicular to the direction of movement of the table 10. Thus, a workpiece clamped to the table 10 may be moved to any desired location by a suitable combination of movements of the table 10 (right and left in FIGURE 1) and the carriage 12 (toward and away from the reader). Control of traverse of the table 10 is accomplished by a positioning system described in detail below. It will be understood that control of the carriage 12 may be accomplished in a similar manner.

Illustratively, the instructions for operation of the machine may be recorded on tape in which punched holes are used to register the recorded information in a suitable binary code. Position instructions are taken from the tape by a tape reader 20 whose output is connected to a master control unit 22. An output of the control unit 22 is connected to a digital-to-analog converter 23 whose output provides one input of a summing unit 24. The other input of the summing unit 24 is from a position transducer 25 which provides a voltage indicative of the actual position of the table 10. The transducer 25 may take the form of a helical potentiometer mechanically coupled to a rotating member in the drive unit 16.

The error signal appearing at the output of the summing unit 24 is fed to an input 26a of a table control unit 26. The control unit 26 controls motors in the drive unit 16 as well as gear arrangements used to couple the motors to the shaft 18 for translatory motion of the latter member. The motion imparted to the shaft 18 is such as to make the output voltage of the transducer 25 approach the voltage from the converter 23.

Still referring to FIGURE 1, precise, discrete increments of travel of the worktable 10 are sensed by a position sensing unit generally indicated at 28. The unit 28 includes a sensing head 30, a null detector 32 and a false null compensator 34. The sensing head 30 is positioned immediately below a measuring bar 36 attached to the slide 14. It is mounted on a slide 38 fitted to a track 40 on the carriage 12. The measuring bar 36 and track 40 are aligned with the direction of motion of the table 10 on the carriage 12. Movement of the sensing head 30 along the track 40 is effected by means of a sensing head drive unit 42 acting through a shaft 44.

The measuring bar 36 is provided with lands 46 periodically disposed along its length. The sensing head 30 is used to detect the passage of the individual lands 46 thereover during traverse of the table 10, and in a manner described below, the null detector 32 emits output signals when the lands 46 assume certain positions with respect to the sensing head. The false null compensator 34, connected to the output of the detector 32, emits an output signal each time a land 46 arrives at a unique position over the sensing head 30. More particularly, in the embodiment of our invention described herein, a signal is emitted by the compensator 34 each time a land 46 arrives at the true null position, i.e., centered over the sensing head 30.

The lands 46 are centered a convenient distance apart, e.g., one inch, which is the range of the fine position control. In order to vary the stopping position of the table 10 over this range, the position of the sensing head 30 is adjusted by the drive unit 42 at the beginning of each table-positioning operation.

More specifically, as seen in FIGURE 1, the power to the drive unit 42 is supplied by a control unit 48 which controls the magnitude and relative polarities of currents in the windings of a motor (not shown) contained in the unit 42. The motor is mechanically coupled to a micrometer screw (not shown) which is connected to the shaft 44. Rotation of the micrometer screw by the motor causes the shaft 44 and sensing head 30 to traverse to the left or right, depending on the direction of rotation. The direction of rotation of the motor, in turn, depends on the polarity of the current supplied from the control unit 48. The input signal to the control unit is an error voltage derived in a well-known manner from a summing unit 50 which compares the output voltage of a position transducer 52 with a fine position voltage obtained from the master control unit 22 by way of a digital-to-analog converter 54. The latter voltage corresponds to the desired position of the sensing head 30. The output voltage of the transducer 52 represents the actual position of the sensing head 30, and the control unit 48 causes the sensing head 30 to be traversed in the proper direction to reduce the output voltage of the summing unit 50 and thus reduce the difference between the actual and desired positions of the sensing head.

Operation of the positioning system of FIGURE 1 is as follows. Assume a reference or zero point on the carriage 12 from which positions of the worktable 10 are measured. The instructions on the tape passing through the tape reader 20 are in terms of distance of a reference point on the table 10 from the zero point on the carriage. The master control unit 22 transmits the desired position to the digital-to-analog converter 23, and the table control unit 26 then initiates traverse of the table 10 in response to a start signal fed to an input 26b.

At the same time, the control unit 22 transmits to the converter 54 the digits to the right of the decimal place, i.e., fraction of an inch, in the instruction from the tape reader 20. In response to a start signal from the master control unit, the control unit 48 then commences adjustment of the sensing head 30 in the above-described manner. More specifically, the sensing head 30 has a zero position on the carriage 12. When it is in this position, the respective lands 46 on the measuring bar 36 pass through the true null position at integral inch distances of the table 10 from its reference position. In order to position the worktable at other than integral inch distances, the sensing head 30 is moved a distance from its reference point equal to the fractional part of an inch in the desired table position.

Next, assume leftward motion of the worktable 10 (FIGURE 1), with the land 46a in the true null position over the sensing head 30 when the table reaches its desired position. A level detector 55, connected to the output of the summing unit 24, emits a signal when the error voltage corresponds to a positional error of less than one inch for the table 10, i.e., after the land 46b has passed the true null position but before the land 46a has reached the speed-reducing offset null position. This range is almost a full inch, since the latter null position is immediately prior to the true null position of the land 46a.

The output signal of the detector 55 is used to open a gate 56 between outputs 34a and 34b of the compensator 34 and inputs 26c and 26d, respectively, of the table control unit 26. When the land 46a passes through the first or speed-reducing null position, a signal from the output 34a causes a reduction in table speed. At the same time, a signal from an output 34c is discontinued and the null detector 32 reverts to its normal state. When the land 46a arrives at the true null position, a signal from the detector 32 is emitted from the compensator output 34b through the gate 56 to the table control unit input 26d to stop the table.

Referring now to FIGURE 2, the sensing head 30 has the shape of an E core with projections 30a, 30b and 30c. A coil 57, having an inductance $L_a$, is formed on the projection 30a, and a coil 58 with an inductance $L_b$ is formed on the projection 30b. Assuming that the coils 57 and 58 are identical, the inductances $L_a$ and $L_b$, which depend on the reluctances of the magnetic paths through the coils, will be equal when a land 46 is centered over the projection 30c, as shown in FIGURE 2. As noted above, this is the true null position of a land.

The manner in which the positions of the respective lands 46 over the sensing head 30 are ascertained is illustrated in FIGURE 4. As shown therein, the null detector 32 includes a bridge circuit having as its arms the inductances $L_a$ and $L_b$ and a pair of resistors R1 and R2. The bridge is powered from an alternating current source indicated at 60. The bridge output voltage is taken from a pair of junctions 62 and 64 and amplified by an amplifier 66 before rectification by a rectifier 68. A level discriminator 69, such as a Schmitt trigger or the like, emits a signal from an output 69a whenever the output voltage of the rectifier 68 is below a predetermined level and a signal from an output 69b whenever the rectifier voltage is above this level. A signal from the output 69a indicates balance or null of the bridge circuit, and a signal from the output 69b indicates absence of a null condition.

Illustratively, R1 equals R2, and therefore balance of the bridge will take place whenever $L_a$ equals $L_b$. Since the coils 57 and 58 are identical, the latter condition will occur, for example, in the true null position of FIGURE 2.

In order to compensate for departures of the values of the various bridge parameters from their nominal values, we have included a potentiometer 70 whose tap 70a is connected to the voltage source 60. Adjustment of the tap 70a changes the relative resistances on the two sides of the bridge and thus changes the effective values of R1 and R2. The potentiometer 70 may be adjusted by first setting the sensing head 30 in a true null position and then moving the tap 70a to provide a null in the output of the rectifier 68.

Still referring to FIGURE 4, our invention includes the addition of certain elements to the bridge circuit therein to cause a null output at a position other than the true null position of FIGURE 2. More specifically, the resistor R2 may be a potentiometer provided with a tap R2a. The tap is connected to a resistor R3 in turn connected to a grounded junction 72 at the far end of the coil 58 by a switch S1. When the switch S1 is open, balance of the bridge circuit will occur at the true null position of FIGURE 2, as described above.

When the switch is closed, balance will occur at an offset true null position instead of the true null position. As seen in FIGURE 6, the first offset true null condition occurs immediately before the table 10 and measuring bar 36 attached thereto arrive at a true null position. Assuming that R1 plus the portion of the potentiometer 70 connected thereto is substantially equal to R2 plus its associated portion of the latter potentiometer, the relationships of the position of the tap R2a and the resistance of the resistor R3 to the inductances $L_a$ and $L_b$ of the coils 57 and 58 at the first offset null position are given by, $$\alpha = \frac{\omega^2 L_a L_b - R_a^2}{R2 R_a} \quad (1)$$

and $$R3 = \frac{(1-\alpha)[\alpha R2 L_b + R_a(\omega L_a + \omega L_b)]}{\omega L_a - \omega L_b} \quad (2)$$

where $\alpha$ is the fraction of the resistance R2 between the tap R2a and the coil 58, $R_a$ is the resistance of the coil 57,
$R_b$ is the resistance of the coil 58, and
$\omega$ is the angular frequency of source 60.

Expressions 1 and 2 neglect the effect of the mutual inductance M of the coils 57 and 58. The mutual inductance may be accounted for approximately by substituting $(L_a - M)$ and $(L_b - M)$ for $L_a$ and $L_b$, respectively.

An important advantage of our offset null circuit is its simplicity. It requires only the addition of the resistor R3 and switch S1 and the use of a potentiometer as the resistor R2. Moreover, the values of $\alpha R2$ and R3 may be readily varied to change the positions of the offset nulls. Another advantage is the ease with which a number of offset circuits may be switched into and out of operation to provide for different offset conditions at different intervals of travel of the lands 46 (FIGURE 1).

Turning now to FIGURE 5, the switch S1 includes a pair of transistors 76 and 77 connected in reverse parallel between the resistor R3 and the junction 72. Thus, the emitter 76a and collector 77c are connected to the resistor R3 while the collector 76c and emitter 77a are connected to the junction 72. The transistors are shown as p-n-p transistors, and therefore their bases 76b and 77b are positively biased from a bias source (not shown) by way of resistors R4 and R5, respectively. A pair of series resistors R6 and R7 are connected between the transistor bases and the input terminal 78 of the switch S1. A resistor R8 is connected between the terminal 78 and ground.

The bias voltage and the resistances of the resistors R4–R8 are chosen so that in the absence of an input signal at the terminal 78, the potentials of the bases 76b and 77b will always be greater than the instantaneous voltage at the tap R2a. Thus, both transistors 76 and 77 will be cut off and the switch S1 will be open.

When an input signal in the form of a negative voltage is applied to the input terminal 78, base-emitter conduction takes place in both the transistors 76 and 77, thereby saturating the transistors and providing low impedance paths through them from the resistor R3 to ground. The input signal at the terminal 78 thus effectively closes the switch S1 to place the null detector 32 in the first offset condition.

A second switch S2, similar to the switch S1, is connected between ground and a resistor R9 tied to the tap R2a. Thus, when an input signal is applied to the input terminal 80 of the switch S2, the detector 32 is placed in the second offset condition. The positions of the first and second offset nulls corresponding to the offset conditions are determined by the setting of the tap R2a and the resistances of the resistors R3 and R9, as described above.

Still referring to FIGURE 5, the false null compensator 34 includes a series of "nor" elements 84–101 connected in a logical circuit which operates in the manner described below. The voltages at the outputs 69a and 69b of the level discriminator 69 alternate between two levels, depending on the existence or absence of a null. These levels correspond to the binary digits 0 and 1. Thus, when there is a null, the output 69a will register a 1 and the output 69b a 0; when there is no null, the voltages at the outputs 69a and 69b will correspond to 0 and 1, respectively.

Each of the "nor" elements 84–101 is an inverter which provides an output signal, i.e., a 1, when each of its input signals is 0. Thus, the logic equation for each of the units is, $$W = \overline{X} \cdot \overline{Y} \cdot \overline{Z}$$

or, $$\overline{W} = X \vee Y \vee Z$$

where,

W is the output level, and X, Y and Z are the input levels.

The circuit of FIGURE 7 is a convenient embodiment of this type of element. As shown therein, a transistor 102 has a collector 102c connected to a source of negative bias (not shown) through a resistor R10. The base 102b is connected to the positive bias source through a resistor R11. The X, Y and Z input signals are applied in series with resistors R12, R13 and R14, across the base 102b and the grounded emitter 102a. The output W is taken from the collector 102c. A 1 is represented by a negative voltage level and a 0 by 0 volts. It will be apparent that, in the absence of input signals X, Y and Z, i.e., $X=Y=Z=0$, the transistor 102 will be biased to cutoff by the positive bias applied to the base. The output voltage will then be the potential of the negative bias, i.e., a 1. If any of the inputs is a 1, a negative voltage will be applied to the base 102b and the transistor 102 will conduct, thereby grounding the collector 102c and reducing W, the voltage at the output, to 0.

Referring once again to FIGURE 5, the output voltages of the elements 84–101 are designated by the letters A–M and P–T, respectively. Voltages at the outputs 69a and 69b of the discriminator 69 are designated herein as N and $\overline{N}$, respectively. Following this convention, an input of the "nor" element 85 is A, and an input of the element 84 is B. The cross coupling of these two elements makes a memory 84—85 out of them, since, if the output of one of them is a 1 and the other a 0, this condition will remain as long as no counteracting input signal is applied. In particular, in order to reverse the state of the memory, an input signal, i.e., a 1, is applied to the element whose output is 1, and the output is forced to 0. The output of the other element, which was a 0, will then go to 1. This 1 will maintain the output of the first element at 0, after the counteracting input signal is removed. The compensator 34 also includes memories 87—88, 90—91, 93—94, 96—97 and 99—100, similar to the memory 84—85. The states of the memories may be considered "on" when the outputs of the upper "nor" elements (FIGURE 5) are 1's, and "off" when they are 0's.

An additional input to the elements 84 and 87 is the output of the element 90 (G). The element 85 has as one of its inputs the output of the element 101 (T), and another is a switch 103 connected to a source of 1 voltage, illustratively indicated as a battery 104. The switch 103 is also connected to inputs of elements 87, 90 and 93. The inputs of the "nor" element 86 are B and $\overline{N}$, and the output C of this element is an input of the element 88. N and E are inputs for the elements 89 whose output F is an input for the element 91. Similarly, H and $\overline{N}$ are the inputs for the element 92, and P and $\overline{N}$ for the element 98, while the outputs I and Q of these elements are inputs for the elements 94 and 100, respectively. In like manner, K and N are the inputs for the element 95, and the element 101 has S and N as its inputs, the output L of the element 95 being one of the inputs of the element 97.

Still referring to FIGURE 5, it is seen that M is an additional input for both the "nor" elements 90 and 93, and A is an additional input for the elements 96 and 99. A is also the voltage at the output 34d of the compensator 34 connected to the switch terminal 80 of the null detector 32. The voltage G appears at the output 34c connected to the switch terminal 78. The outputs 34a and 34b, connected to the table control unit 26 (FIGURE 1) by way of the gate 56, are M and Q, respectively.

The compensator 34 is initially set by momentarily closing the switch 103. This places the memory 84—85 in the "on" state and the memories 87—88, 90—91 and 93—94 in the "off" state. In the "on" state of the memory 84—85, A is 1, thereby imposing the "off" condition on the memories 96—97 and 99—100. Also, as pointed out above, a 1 is denoted by a negative voltage, and therefore the switch S2 connected to the output 34d is closed, thereby placing the null detector 32 in the second offset condition. The conditions at the outputs of the various "nor" elements are given on line 1 of FIGURE 8.

Assume that, with leftward motion of the worktable 10 and measuring bar 36, motion begins with the land 46b to the left of the true null position, as seen in FIGURE 6, and before the next false null position of the measuring bar 36 is reached. With the null detector 32 in the second offset condition, the bar 36 will pass through the false null and first offset false null positions without emitting an output signal. However, a null will be indicated at the second offset false null position, or if that null is not detected, there will be an indication when the second offset true null is reached.

The null indication will be in the form of a change of N from 0 to 1 and $\overline{N}$ from 1 to 0. As seen from FIGURE 5, both inputs of the element 86 will then be 0, and C will therefore go from 0 to 1, thereby shifting the memory 87—88 to the "on" condition. The circuit conditions will then be as indicated on line 2 of FIGURE 8.

As the measuring bar 36 (FIGURE 6) leaves the above null position, N reverts to 0 and $\overline{N}$ to 1. With both inputs of the "nor" element 89 at 0, F goes to 1, thereby imposing the "on" condition on the memory 90—91. G is therefore 1, and thus the memories 84—85 and 87—88 are switched to the "off" condition, as indicated on line 3 of FIGURE 8. Also, it is seen that the changes at this point cause opening of the switch S2 and closure of the switch S1. Consequently, the null detector 32 is in the first or speed-reducing offset condition.

The measuring bar 36 continues its movement until the first offset true null position is reached, as indicated in FIGURE 6. As seen in FIGURE 5, N once again changes to 1 and $\overline{N}$ to 0. Both inputs of the "nor" element 92 are therefore 0, and I changes to 1. This causes a shift of the memory 93—94 to the "on" condition. The conditions of the various "nor" elements at this position are shown on line 4 of FIGURE 8.

When the measuring bar 36 leaves the first offset true null position, N goes to 0 and $\overline{N}$ to 1. Both inputs of the element 95 are now 0, and L therefore shifts to 1, thereby changing the memory 96—97 from the "off" to the "on" state. M is therefore 1, and, if the gate 56 is open, a speed-reducing signal will be transmitted from the output 34a to the table control unit 26 (FIGURE 1). At the same time, the memories 90—91 and 93—94 are returned to the "off" state, as indicated on line 5 of FIGURE 8. The detector 32 is now in its normal condition, without offset, and thus ready to detect the forthcoming true null.

Assuming that the speed-reducing signal has been transmitted to the table control unit 26, the measuring bar 34 continues at greatly reduced speed toward the true null position of the land 46a (FIGURES 1 and 6). At the true null position, N goes to 1 and $\overline{N}$ to 0, and the conditions reached by the various "nor" element outputs are shown on line 6 of FIGURE 8. Thus, with both inputs of the element 98 at 0, Q goes to 1 and a stop signal is transmitted from the output 34b to the table control unit 26. The worktable 10 (FIGURE 1) then coasts to a stop, as described above.

It will be noted that the above sequence of changes in the conditions of the "nor" element outputs in FIGURE 5 will be the same whether or not the second offset false null position is detected. If it is detected, the detector 32 will be in the first offset condition as the measuring bar 36 passes through the second offset true null position, and therefore the latter position will not be detected. If the second offset false null position is not detected, the detector 32 will remain in the second offset condition until it reaches the second offset true null position which will then be detected. Thus, for each unit of travel of the measuring bar 36, either the second offset false null position or the second offset true null position will be detected. The offset true null and and first offset false null positions are never detected, because the detector 32 is in the second offset condition when it passes through these points. The first offset true null position and the true null position are always detected. Thus, by switching the detector 32 into its offset and normal conditions, the compensator 34 converts the detection of true nulls to a simple counting operation whereby every third null indicated at the output of the null detector 32 is a true null. Indeed, as will be seen, the compensator 34 operates as a ring counter when used to count a succession of true nulls.

More specifically, assuming that the gate 56 was closed, and therefore speed-reducing and stop signals were not transmitted to the table control unit 26, arrival of the land 46a (FIGURE 6) at the true null position shifts Q to 1, as stated above, and the memory 99—100 is therefore switched to the "on" state. The compensator conditions at this point are reflected on line 6 of FIGURE 8. When the land 46a leaves the true null position, accompanied by a change of N to 0 and $\bar{N}$ to 1, both inputs of the "nor" element 101 will be 0. T will thus be 1, thereby shifting the memory 84—85 to the "on" condition and placing the detector 32 in the second offset condition. With A at 1, the memories 96—97 and 99—100 are turned off. The voltage conditions in the compensator 34 will thus be as indicated on line 7 of FIGURE 8. Line 7 is identical to FIGURE 1, and therefore the above cycle of changes in the comparator 34 will take place as the measuring bar 36 goes through its next unit of travel over the sensing head 30.

Proper operation of the circuit of FIGURE 5 requires that the initial conditions be imposed at or prior to the last second offset true null position preceding the final true null or stopping position of the measuring bar 36 (FIGURE 6). This is assured by the fact that, in order to maintain uniform stopping conditions, the table control unit 26 causes the table to back off (to the right in FIGURES 1 and 6) to provide a minimum travel of one-half inch whenever the required displacement of the worktable 10 is less than that figure.

It will be apparent that other circuits than the ones specifically described in FIGURE 5 may be made to operate in the above manner. For example, the outputs of the discriminator 69 may be passed through differentiators which provide pulses when the discriminator shifts from one state to the other. The pulses may then be counted in a pulse counter. Also, if the counting of successive true nulls is not required, the "nor" circuits 99, 100 and 101 may be eliminated. In such case, the switch 103, which may take any suitable form, may be momentarily closed by the signal from the level detector 55 which opens the gate 56.

Another modification of the circuit of FIGURE 5 may be made when there is a requirement that the successive lands of the measuring bar 36 (FIGURE 1) be counted and no requirement that speed-reducing and stop signals be emitted by the compensator 34. This permits elimination of the offset circuit associated with the first offset condition of the detector 32. The compensator 34 may then be simplified by the elimination of six of the "nor" elements therein, since there will be only two instead of three nulls to be counted for each unit of travel of the measuring bar. The principle of operation, however, will still be the same. Each true null will be detected by the detector 32 as well as one or the other of an offset false null and an offset true null.

With the circuit of FIGURE 5, our positioning system is adapted to operate with the table 10 (FIGURE 1) approaching from the right. The system may be adapted for approach from the left as well by adding a second set of offset null circuits comprising resistors connected between a tap on the resistor R1 and ground, with switches similar to the switches S1 and S2 connected to switch the resistors into and out of the circuit. Then, for leftward movement of the table 10, the offset circuitry shown in FIGURE 5 will be connected to the false null compensator 34, and for rightward movement, the offset circuit on the other side of the bridge circuit will be connected to the compensator. It will be apparent that our invention is not limited to straight line motion but may also be used to control the angular positions of rotating members. In the latter case, the measuring bar 36 (FIGURE 1) will have an arcuate or circular configuration.

FIGURE 9 illustrates another arrangement which may be used to shift an offset null from one side of a true null position to the other. The bridge circuit has been modified to use a potentiometer as the resistor R1. Potentiometer taps R1a and R2a are connected to the end terminals of a potentiometer R10. The tap R10a of the potentiometer R10 is connected to ground by way of the switch S1.

Assuming that R1 equals R2 and that the taps R1a and R2a are set at the same points along the potentiometers R1 and R2, respectively, there is no offset in the circuit when the switch S1 is open. When the switch is closed, the null position of the bridge will be offset to the right or left of the normal position, depending on which side of the electrical midpoint of the potentiometer R10 the tap R10a is on. In other words, the offset position can be shifted from one side of the normal position to the other by moving the tap 10a from one side of the electrical midpoint of the potentiometer R10 to the other. The distance of the offset position from the normal position depends on the electrical "distance" of the tap 10a from the midpoint of the potentiometer. The tap 10a may be moved automatically to shift the offset position as required in the positioning system described above or in other systems in which the bridge is used.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

We claim:

1. In a positioning system adapted to position a first element with respect to a second element, said system having a fine position control including a serrated bar mounted on one of said elements and a magnetic sensing head mounted on the other of said elements, said bar and sensing head being so disposed that the serrations of said bar successively pass over said sensing head during movement of said first element, and a null detector adapted to emit an output signal when a serration arrives at first and second positions with respect to said sensing head, said system also including a coarse positioning control adapted to bring a selected serration into the field of said sensing head, the improvement characterized by a false null suppressor adapted to eliminate random detection of said second positions, said suppressor including first offset means adapted when connected to said detector to cause said detector to emit signals at third and fourth positions of said serration instead of said first and second positions, said third and fourth positions being reached by said serrations after said second position and before said first position, means adapted to connect said first offset means to said detector before a serration reaches said third position and disconnect said first offset means when the next signal is emitted by said detector, whereby said detector emits one signal when said serration passes through said third and fourth positions and another signal when said serration passes through said first position.

2. The combination defined in claim 1 in which said suppressor has a first output terminal, means for indicating signals from said detector at said first terminal, and means for suppressing at said first terminal signals other than those occurring when serrations pass through said first position.

3. The combination defined in claim 1 in which said sensing head comprises a pair of inductors whose inductances are functions of the positions of said serrations relative thereto, said detector comprising a bridge circuit including said inductors, the parameters of said bridge circuit being such that a null is obtained whenever one of said serrations is in said first position, and including means for emitting a signal whenever the unbalance voltage of said bridge circuit is below a predetermined level.

4. The combination defined in claim 3 in which said offset means comprises a circuit element which when connected to said bridge circuit alters the balance conditions thereof so as to provide nulls at said third and fourth positions.

5. The combination defined in claim 1 including second offset means adapted when connected to said detector to cause said detector to emit signals at a fifth position intermediate said second and third positions and a sixth position intermediate said fourth and first positions, means for connecting said second offset means to said detector when said first offset means is disconnected and disconnecting said second offset means when the next signal following disconnection of said second offset means is emitted by said detector, and means adapted to reduce the relative speed of said elements when said second offset means is disconnected.

6. A position sensing system adapted to sense the position of a first element with respect to a second element, said system comprising, in combination, a serrated bar of magnetic material mounted on said first element, a sensing head mounted on said second element, said bar and sensing head being so disposed with respect to each other that successive serrations on said bar move past said sensing head during relative movement of said elements, said sensing head comprising a pair of inductors whose inductances are functions of the distances of said serrations therefrom, a detector including said inductors and adapted to provide an output signal when a serration arrives at a first position and a second position with respect to said sensing head, said detector including first offset means adapted when connected to said detector to cause said detector to emit signals when said serration is at third and fourth positions instead of said first and second positions, said third and fourth positions being reached in order by said serrations after said second position and before said first position, and a false null suppressor adapted to compensate for random detection of arrivals of said serrations at said second position, said suppressor comprising means adapted to connect said offset means to said detector after a serration has reached said first position and means adapted to disconnect said offset means when the next signal is emitted by said detector.

7. The combination defined in claim 6 including second offset means adapted when connected to said detector to cause said detector to emit signals when said serration is at a fifth position intermediate said second and third positions and a sixth position intermediate said fourth and first positions instead of at said first, second, third and fourth positions, means adapted to connect said second offset means to said detector when said first offset means is disconnected therefrom and to disconnect said second offset means when the next signal following said disconnection is emitted by said detector and means for emitting an output signal when said second offset means is disconnected.

8. The combination defined in claim 6 in which said detector includes a bridge circuit comprising a source of electrical potential having first and second terminals, a first resistor connected to said first terminal and connected in series with one of said inductors between said terminals, a second resistor connected to said first terminal and connected in series with the other of said inductors between said first and second terminals, said offset means comprising a third resistor, a tap on said first resistor and a switch adapted to connect said third resistor between said tap and said second terminal.

9. The combination defined in claim 8 in which said suppressor is adapted to close said switch when a serration reaches said first position and open said switch when the next signal is emitted by said detector.

10. The combination defined in claim 7 including a first switch adapted to connect said first offset means to said detector, means for closing said first switch after a first serration has passed said first position and before the next serration has reached said fourth position, a counter adapted to count said signals from said detector, said counter having a first output adapted to emit a signal in response to the next signal from said detector after said closing of said first switch, a second switch adapted to connect said second offset means to said detector in response to said signal from said first output, said counter having a second output adapted to emit a signal when said next serration passes through the next position at which said detector emits a signal, said second switch being adapted to disconnect said second offset means in response to said signal from said second output, whereby both said offset means are disconnected from said detector, said counter having a third output adapted to emit a signal when said serration arrives at the next position at which said detector emits a signal following said signal from said second output.

11. The combination defined in claim 10 in which said counter is a ring counter and includes a fourth output adapted to emit a signal when said serration leaves said last-mentioned position, said first switch being adapted to connect said first offset means to said detector in response to said signal from said fourth output.

12. A detector adapted to emit signals corresponding to the passage of serrations on a magnetic bar through a first position with respect thereto, said detector comprising first and second inductors whose inductances are functions of the positions of said serrations with respect thereto, a source of alternating potential having first and second terminals, a first resistor connected to said first terminal and connected in series with said first inductor between said first and second terminals, a second resistor connected to said first terminal and connected in series with said second inductor between said first and second terminals, said first resistor having a tap thereon, a third resistor and a switch connected in series with said third resistor between said tap and said second terminal.

13. The combination defined in claim 12 in which, when said switch is open, said detector emits signals when said serrations pass through a second position with respect thereto and when said switch is closed said detector emits signals at said first position and when said serrations pass through third and fourth positions after said second position and before said first position instead of at said first and second positions.

14. The combination defined in claim 12 including an E core of magnetic material, said E core having first and second outer projections and an inner projection, said inductors being coils wound around said first and second projections, said first position of a serration occurring when a serration on said bar is positioned substantially directly opposite said inner projection and equidistantly from said first and second projections.

15. A detector adapted to emit signals corresponding to the passage of serrations on a magnetic bar through a first position with respect thereto, said detector comprising an E core of magnetic material, said core having first and second outer projections and an inner projection, a first coil wound on said first projection, a second coil wound on said second projection, a source of alternating current potential having first and second terminals, a first resistor connected to said first terminal and connected in series with said first coil between said first and second terminals, a second resistor connected to said first terminal and connected in series with said second coil between said first and second terminals, a tap on said first resistor, a third resistor and a switch connected in series between said tap and said second terminal, the resistances of said resistors and the inductances of said coils being such that when one of said serrations is at said position and said switch is open there is a minimum in the voltage between the junctions of said first resistor and said first coil and the junction between said first resistor and said second coil.

16. The combination defined in claim 15 including means adapted to emit an output signal whenever the voltage between said junctions is below a predetermined level.

17. In apparatus adapted to emit output signals corresponding to the passage of serrations on a bar of magnetic material into a first position with respect to sensing elements of a detector, said detector being adapted to emit signals when said serrations pass into said first position, said detector also being adapted to emit signals in random fashion when said serrations pass into a second position with respect to said sensing head, the combination of offset means adapted to cause said detector to emit signals when said serrations pass through third and fourth positions with respect to said sensing head instead of said first and second positions, each of said serrations passing through said third and fourth positions after passage through said second position and prior to passage through said first position, a compensator adapted to activate said offset means after a serration reaches said first position and inactivate said offset means after the next signal from said detector, said compensator being adapted to emit one output signal from each two signals emitted by said detector.

18. The combination defined in claim 17 in which said compensator is a counter adapted to count said signals from said detector, said counter having a first output adapted to emit a signal in response to the signal emitted by said detector when a serration passes through said third and fourth positions, said apparatus including means adapted to inactivate said offset means in response to said signal from said first output of said counter, said counter also being adapted to emit a signal in response to the next signal emitted by said detector after inactivation of said offset means.

19. The combination defined in claim 18 in which said counter is a ring counter adapted to emit an activation signal when a serration passes through said first position, said apparatus including means for activating said offset means in response to said activation signal.

20. A detector adapted to emit signals through the passage of serrations on a magnetic bar through a first position with respect thereto, said detector comprising first and second inductors whose inductances are functions of the positions of said serrations with respect thereto, a source of alternating potential having first and second terminals, a first resistor connected to said first terminal and connected in series with said first inductor between said first and second terminals, a second resistor connected to said first terminal and connected in series with said second inductor between said first and second terminals, said first and second resistors having taps thereon, a potentiometer whose end terminals are connected to said taps on said first and second resistors, means connecting the tap on said potentiometer to said second terminal, and sensing means sensitive to the potential between the junction of said first resistor and said first inductor and the junction between said second resistor and said second inductor.

References Cited in the file of this patent

UNITED STATES PATENTS

| | | |
|---|---|---|
| 2,455,364 | Hays | Dec. 7, 1948 |
| 2,543,950 | Yardeny et al. | Mar. 6, 1951 |
| 2,724,782 | Holloway | Nov. 22, 1955 |
| 2,767,330 | Marshall | Oct. 16, 1956 |
| 2,828,456 | Kamin | Mar. 25, 1958 |
| 2,892,945 | Ule | June 30, 1959 |
| 2,905,874 | Kelling | Sept. 22, 1959 |
| 2,907,937 | Agpar et al. | Oct. 6, 1959 |
| 2,947,929 | Bower | Aug. 2, 1960 |
| 2,992,374 | Grace | July 11, 1961 |